(12) United States Patent
Schweitzer et al.

(10) Patent No.: US 12,005,740 B2
(45) Date of Patent: *Jun. 11, 2024

(54) TIRE TREAD AND A TIRE COMPRISING A TREAD

(71) Applicant: THE GOODYEAR TIRE & RUBBER COMPANY, Akron, OH (US)

(72) Inventors: Claude Schweitzer, Colmar-Berg (LU); Jean-Louis Marie Felicien Thomas, Arlon (BE); Bodo Ahrens, Trier (DE); William Alain Francis Ghislain Talbot, Bastogne (BE); Germain Dehez, Montleban (BE); Hubert Anna Johanes Cox, Eschdorf (LU)

(73) Assignee: THE GOODYEAR TIRE & RUBBER COMPANY, Akron, OH (US)

(*) Notice: Subject to any disclaimer, the term of this patent is extended or adjusted under 35 U.S.C. 154(b) by 600 days.

This patent is subject to a terminal disclaimer.

(21) Appl. No.: 16/991,317

(22) Filed: Aug. 12, 2020

(65) Prior Publication Data

US 2021/0046783 A1    Feb. 18, 2021

Related U.S. Application Data

(60) Provisional application No. 62/887,168, filed on Aug. 15, 2019.

(51) Int. Cl.
*B60C 11/00*    (2006.01)
*B60C 1/00*    (2006.01)
(Continued)

(52) U.S. Cl.
CPC .......... *B60C 11/005* (2013.01); *B60C 1/0016* (2013.01); *B60C 11/0008* (2013.01);
(Continued)

(58) Field of Classification Search
CPC ... B60C 11/005; B60C 1/006; B60C 11/0008; B60C 2011/0016; B60C 11/00;
(Continued)

(56) References Cited

U.S. PATENT DOCUMENTS

| 5,176,765 A | * | 1/1993 | Yamaguchi | ........... B60C 11/005 152/209.7 |
| 8,439,095 B2 | | 5/2013 | Zhang et al. | |

(Continued)

FOREIGN PATENT DOCUMENTS

| EP | 3670168 A1 | 6/2020 |
| JP | 2014019198 A | 2/2014 |

OTHER PUBLICATIONS

Office Action dated Apr. 5, 2022 for European Patent Application 20189460.7-1012, the European counterpart to the subject patent application.

(Continued)

*Primary Examiner* — Christopher M Rodd
*Assistant Examiner* — Shibin Liang
(74) *Attorney, Agent, or Firm* — Alvin T. Rockhill

(57) ABSTRACT

In a first aspect of the present invention, a tire tread is provided, the tread comprising a tread cap comprising a first rubber compound for contacting the road when driving, at least one circumferential groove reinforcement forming at least one of the grooves in the tread cap, the groove reinforcement comprising a second rubber compound for reinforcing an area adjacent the grooves formed by the groove reinforcement, wherein the groove reinforcement comprises for at least one of the grooves formed by the groove reinforcement two groove sidewall layers, each sidewall layer extending from the outer radial surface of the unworn tread down into the direction of the bottom of the groove formed by the groove reinforcement and wherein (Continued)

each sidewall layer has an essentially uniform thickness along its length, and wherein the groove reinforcement comprises a groove support portion forming a bottom portion of the groove and having a radially inner base side as well as a radially outer top side, wherein the groove support portion tapers from its base side to its top side.

19 Claims, 5 Drawing Sheets

(51) Int. Cl.
*C08L 7/00* (2006.01)
*C08L 9/00* (2006.01)
(52) U.S. Cl.
CPC .................... *C08L 7/00* (2013.01); *C08L 9/00* (2013.01); *B60C 2011/0016* (2013.01); *C08L 2205/035* (2013.01)
(58) Field of Classification Search
CPC ....... B60C 9/18; B60C 11/13; B60C 11/0066; C08L 7/00; C08L 9/00; C08L 2205/035
See application file for complete search history.

(56) References Cited

U.S. PATENT DOCUMENTS

| | | |
|---|---|---|
| 8,833,411 B2 | 9/2014 | Zhao |
| 8,919,404 B2 | 12/2014 | Schweitzer et al. |
| 9,545,823 B2 | 1/2017 | Zhao et al. |
| 9,623,707 B2 | 4/2017 | Schweitzer et al. |
| 9,757,986 B2* | 9/2017 | Zhao .................... B60C 11/005 |
| 10,040,318 B2 | 8/2018 | Meza et al. |
| 10,427,463 B2 | 10/2019 | Schweitzer |
| 2009/0084477 A1 | 4/2009 | Sandstrom et al. |
| 2010/0154948 A1 | 6/2010 | Dahlberg et al. |
| 2010/0243116 A1* | 9/2010 | Yasunaga ................ B60C 11/24 425/35 |
| 2016/0059632 A1 | 3/2016 | Zhao et al. |
| 2016/0082774 A1 | 3/2016 | Zhao et al. |
| 2018/0134086 A1* | 5/2018 | Schweitzer ......... B60C 11/0058 |
| 2019/0255887 A1* | 8/2019 | Perrin ....................... B60C 9/18 |

OTHER PUBLICATIONS

Extended Search Report dated Dec. 13, 2020 for European Patent Application 20189460.7-1012, the European counterpart to the subject patent application.

* cited by examiner

FIG 1 - Prior Art
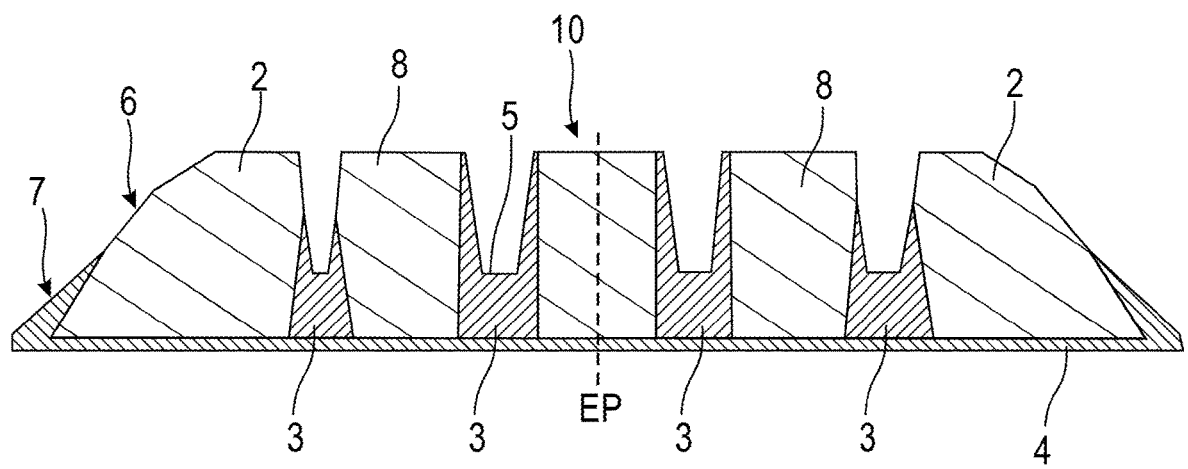
FIG 2 - Prior Art
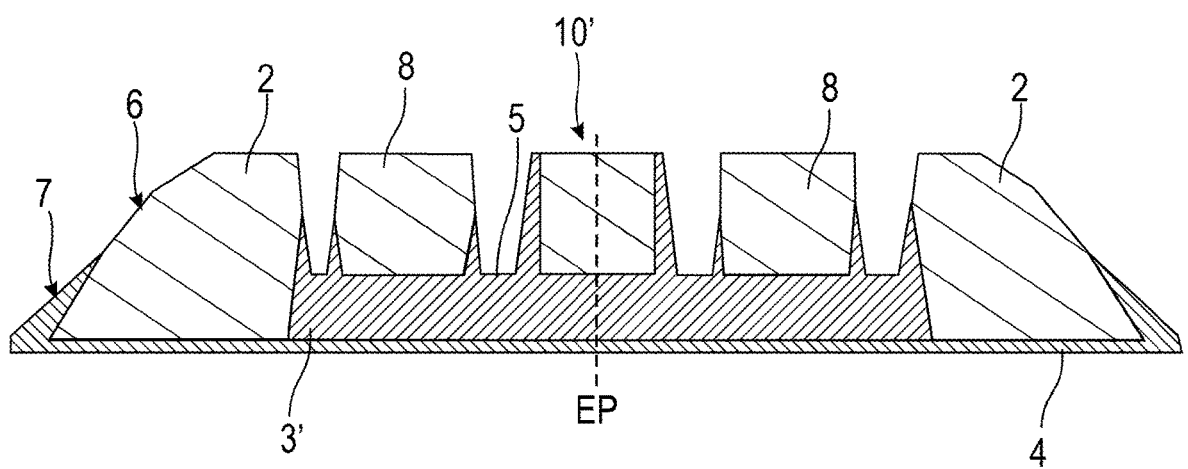

TIRE TREAD AND A TIRE COMPRISING A TREAD

This application claims benefit of U.S. Provisional Patent Application Ser. No. 62/887,168, filed on Aug. 15, 2019. The teachings of U.S. Provisional Patent Application Ser. No. 62/887,168 are incorporated herein by reference in their entirety.

FIELD OF THE INVENTION

The present invention is directed to a tire tread having a tread groove reinforcement and to tires having such treads.

BACKGROUND

Most general purpose pneumatic tires for vehicles, such as automobiles and trucks, include treads having grooves which are designed to direct water away from the tread area to improve traction on wet surfaces. However, some racing tires and tires for vehicles which are used only on dry surfaces have slick treads. In any case, the grooves on tire treads having a considerable influence on a plurality of tire properties, including rolling resistance, wet grip, traction on snow and/or ice, and noise generation characteristics. For instance, one source of increased rolling resistance is caused by the deformation of the tread in the area of the tread grooves and adjacent tread blocks or ribs which results in the generation of heat and accordingly increasing rolling resistance (reduced fuel economy). The performance characteristics of the tire is also impacted by such deformations as the tire rolls against a pavement or road surface during normal use. For example, the cornering stiffness is of the tire can be limited which in turn compromises the handling characteristics, particularly at higher vehicle speeds. In order to overcome such deficiencies and to improve tire performance characteristics numerous approaches for improving tire groove stiffness have been described in the prior art.

U.S. Pat. No. 8,919,404 B2 discloses tire groove reinforcements which extend in a circumferential direction along the tread grooves. In particular, such reinforcements comprise a compound which is relatively stiff compared to the compound which is provided in the tread ribs and laterally outer tread of the tire. U.S. Pat. No. 8,919,404 B2 more specifically discloses a rubber composition for groove reinforcement in a tread for a tire comprising: at least one rubber component; between about 50 phr and 120 phr of a filler, wherein at least 20 phr of the filler is a high surface area carbon black wherein the high surface area carbon black has an iodine adsorption number of at least 100 g/kg; and between 10 phr and 30 phr of a phenolic resin; and wherein the tread has a tread rubber composition for road contact and the rubber composition for groove reinforcement is a different composition located adjacent a groove, covering at least a groove bottom, but not extending to the unworn surface of the tread, the rubber composition for the groove reinforcement having a shore A hardness of greater than 80 and an elongation at break more than 300 percent, and wherein the groove reinforcement has two radially extending portions forming at least partially opposing sidewalls, the adjacent groove and a radially inner base which is in direct contact with a supporting structure arranged under the tread forming distinct reinforcement areas with respect to the lateral direction.

U.S. Pat. No. 9,623,707 B2 further discloses groove reinforcements which can be asymmetric oriented with respect to the center of the groove reinforced. U.S. Pat. No. 9,623,707 B2 more specifically reveals a tire comprising a tread comprising: a plurality of circumferential grooves separating circumferential ribs, each groove comprising a bottom and two sidewalls; one or more groove reinforcements, each groove reinforcement laterally spaced from any other of said one or more groove reinforcements; wherein each groove reinforcement is arranged adjacent one circumferential groove; wherein at least one circumferential groove has no groove reinforcement adjacent to it; and wherein each groove reinforcement extends from the radially inner surface of the tread in a radially outward direction at least to the bottom of the adjacent circumferential groove to form at least part of the bottom of that groove; wherein the groove reinforcement consists of a rubber composition, the rubber composition comprising: between about 50 phr and 120 phr of a filler, wherein at least 20 phr of the filler is a high surface area carbon black having an iodine adsorption number of at least 100 g/kg; and between 10 phr and 30 phr of a phenolic resin. U.S. Pat. No. 9,623,707 B2 further indicates that at least one groove reinforcement can be an asymmetric groove reinforcement which extends in the radial direction to form at least part of at least one sidewall of the adjacent groove, a part of the asymmetric groove reinforcement on one sidewall extending radially further than any part of the asymmetric groove reinforcement on the other sidewall. Such a tread can further a radially innermost tread base, where each groove reinforcement extends from the radially outer surface of the tread base in a radially outward direction at least to the bottom of the adjacent circumferential groove to form at least part of the bottom of that groove.

U.S. Pat. No. 10,427,463 B2 discloses groove reinforcements which also extend in an axial direction over multiple grooves such that the groove reinforcements of the circumferential grooves are integrally connected to one another in an axial direction. The tread intended to contact pavement or a road surface is made of a softer compound than the reinforcement. U.S. Pat. No. 10,427,463 B2 more specifically reveals a pneumatic tire comprising a carcass and a tread located radially outward of the carcass and extending between the tire sidewalls; the tread providing a radially outermost tread running surface; the tread comprising a first tread layer comprising a first rubber compound and a second tread layer comprising a second rubber compound; wherein the second tread layer is located radially adjacent to the first tread layer; wherein the first rubber compound is compositionally distinct from the second rubber compound; wherein the second tread layer comprises one or more integrally formed extensions of the second tread layer extending radially outwardly toward the tread running surface; wherein each of the integrally formed extensions of the second tread layer comprises a circumferentially continuous groove and a reinforcement zone disposed on a side of the groove; wherein the first rubber compound comprises 100 parts by weight of at least one diene based elastomer, and from 1 phr to 150 phr of silica; and wherein the second rubber compound comprises a diene base elastomer, from 50 phr to 120 phr of a filler, wherein at least 20 phr of the filler is a high surface area carbon black having an iodine adsorption number of at least 100 g/kg, from 1 phr to 45 phr of a methylene acceptor, from 1 phr to 25 phr of a methylene donor, and from 1 phr to 30 phr of at least one additive selected from the group consisting of carbamic resins, liquid diene based polymers having a number average molecular weight ranging from 1000 to 25000, and aromatic hydrocarbon resins.

United States Patent Application Publication No. 2010/0154948 A1 discloses a tire tread with groove reinforcement comprising fibers which is basically a lining material within the groove. However, fiber material may be difficult to mix homogeneously into the composition. Inhomogeneities may result in areas of too high fiber concentration which may increase the probability of groove cracks. Moreover, fibers may impair recycling of unused rubber compound as fibers might end up in compounds which shall not include fibers if the new use is not limited accordingly. United States Patent Application Publication No. 2010/0154948 A1 more specifically reveals a tire having an axis of rotation, the tire comprising: two sidewalls extending radially outward; and a tread disposed radially outward of the two sidewalls and interconnecting the two sidewalls, the tread comprising a main portion comprising a first compound and a reinforcing structure comprising a second compound having reinforcing short fibers oriented between −20° to +20° to a circumferential direction of the tread, the main portion of the tread comprising at least one circumferential groove separating circumferential ribs, each circumferential groove having two sides and a base therebetween, the reinforcing structure comprising a layer of the second compound secured to the sides of each circumferential groove.

These prior art approaches focus on influencing the performance characteristics of tires essentially by modifying the properties of the outer tread layer and groove reinforcements. While such approaches may have proven to be beneficial over earlier designs there is still room for further improvement and a long felt need for further innovation and development in this area of tire technology remains today.

SUMMARY OF THE INVENTION

A first object of this invention may be to provide an advanced tire tread.

A second object of this invention may be to provide tire and/or tread wear which offers advanced cornering stiffness without compromising other tire performance characteristics.

A third object of this invention may be to maintain tire tread wear characteristics while improving handling performance and rolling resistance.

Another object of the invention may be to avoid smearing of tread cap compounds into the grooves and to avoid potential groove cracking due to impurities in the groove reinforcement.

In a first aspect of the invention, a tire tread is provided, wherein the tread has circumferential tread grooves and comprises a tread cap comprising a first rubber compound for contacting a road or pavement (which is adapted to be ground contacting) when driving and at least one circumferential groove reinforcement forming (or encasing) at least one of the grooves in the tread cap, the groove reinforcement comprising a second rubber compound for reinforcing an area adjacent the grooves formed by the groove reinforcement, wherein the groove reinforcement comprises for at least one of the grooves formed by the groove reinforcement two groove sidewall layers (in particular per groove formed by the groove reinforcement), each sidewall layer extending from the outer radial surface of the unworn tread down into the direction of the bottom of the groove formed by the groove reinforcement and wherein each sidewall layer has an essentially uniform or essentially constant thickness along its length (extension from the radial outer surface of the tread in the direction of the bottom of the groove), and wherein the groove reinforcement comprises a groove support or base portion forming a bottom portion of the groove and having a radially inner base side (or base area) as well as a radially outer top side (or top area), wherein the groove support portion tapers from its base side to its top side. Such an arrangement provides a uniform support to the radially upper area of the groove and substantially supports also the bottom of the groove by means of the support portion. The groove reinforcement helps to provide uniform properties over wear in tire life. Also smearing of the tread cap compound in the cap areas adjacent the grooves can be avoided during molding and/or curing.

In another embodiment, the tread further comprises a tread base layer arranged radially inwards of the tread cap and comprising a third rubber compound, wherein the groove reinforcement extends in a radially inner direction at least onto the radially outer surface of the base layer, alternatively through the base layer onto a belt or belt overlay. In general, such a far extension of the groove reinforcement may result in a good support of the groove area above the reinforcement.

In still another embodiment, the groove support portion has an essentially trapezoidal shape tapering from the base side to the top side. In general, this covers the possibility that the lateral sides of the trapezoidal shape are straight, convex or concave. The tapering or trapezoidal shape may further improve the supporting function.

In yet another embodiment, the groove support portion extends in a radial outer direction at most 1 mm above the radial height of the radial upper surface of a tread wear indicator of the groove reinforced by the groove reinforcement, optionally at most to the radial height of the radially upper surface of the tread wear indicator or optionally at most essentially up to the bottom of the groove, and wherein the sidewall layers extend to the radial outer side of the groove support portion. This arrangement improves further the constant properties of the tread over wear while allowing at the same time good support properties.

In general, the support portion or its top portion or side may end where the sidewall layers (defined by the uniform thickness) start. This shall not mean that the sidewall layers and the support portion are separate elements. In fact, the sidewall layers and support portions are normally integrally formed or connected. Also, the support portion may have a bottom portion or base side which is not necessarily the end of the groove reinforcement in a radial inner direction. Rather, the term support portion may be understood as portion or area of the groove reinforcement supporting the groove bottom area. However, that shall not be understood in a sense that said tapering shape may be arbitrarily found in any reinforcement of any shape. The shapes claimed herein are supposed to be still visible within their meaning and should not be arbitrarily chosen. Moreover, essentially uniform thickness shall be understood herein as uniform thickness or uniform thickness within the boundaries of manufacturing accuracy. In an embodiment, essentially uniform thickness of the sidewall layers may mean that the thickness over the length of a side wall layer deviates from the average thickness of that sidewall layer by less than 10%, preferably by less than 5%.

In still another embodiment, the groove support portion and the sidewall layers are integrally formed.

In yet another embodiment, the base side is longer than the top side, and the groove support portion has two lateral sides connecting the base side and the top side, and wherein one or both lateral sides may have one of a convex shape, concave shape and straight shape. There may be deviations from a perfect shape of a trapezoid. In general, also top and base side may deviate from a perfect parallel arrangement within the boundaries of normal manufacturing accuracy.

In another embodiment, the base side is longer than the top side, and the groove support portion has two lateral sides connecting the base side and the top side, wherein the angle between at least one of the lateral sides and the base side is at most 85°, optionally at most 80° and at least 30°. This can be considered as a measure for the average slope between edges of the top side and the base side. Such a slope may help to improve support function of the reinforcement for the bottom area of the groove.

In still another embodiment, the tread has a tread base layer arranged radially inwards of the tread cap and the groove reinforcement, wherein the radial height of the groove support portion is at least one of 20%, 50% and 80% of the radial distance between the bottom of the groove and a radial upper side of the tread base layer. Thus, the tread base portion has a substantial radial thickness for supporting the groove's stiffness and stability.

In still another embodiment, the base side of the support portion is from 1.1 to 5, optionally from 1.2 to 4, times longer than the axial width of the bottom of the reinforced groove. This range helps to support the stability of the area around or adjacent the groove.

In still another embodiment, the sidewall layer has a thickness which is within the range of 0.5 mm to 5 mm, optionally from 0.5 mm to 2 mm. Such thickness ranges provide a good compromise between reinforcement and remaining width of tread cap compounds in the ribs or blocks.

In still another embodiment, the groove sidewall layers extend from the (radially outermost) top of the unworn tread (in particular, at the axial position of the reinforced groove) at least over 70% of the depth of the groove measured in parallel to the sidewall of the groove (over this extension the sidewall layers have essentially uniform thickness). In general, the length of a sidewall layer of a groove mentioned herein is viewed from the radial top of the tread into the direction of the bottom of the groove reinforced by the groove reinforcement, unless indicated otherwise herein.

In still another embodiment, the axial diameter of the top side of the groove support portion corresponds essentially to the sum of the axial diameters of the sidewall layer and the inside axial diameter of the groove, at the radial height of the top side of the groove support portion.

In yet another embodiment, a ratio between thickness of the sidewall layer and length (viewed along the height of the groove or sidewall, respectively) of the sidewall layer having uniform thickness is at most 1:10, optionally at most 1:15. In other words this is viewed in a planar cross section perpendicular to the circumferential direction (in parallel to the radial and axial directions). This demonstrates how long and relatively thin the sidewall layers may extend.

In another embodiment, all grooves of the tire are reinforced with said groove reinforcement. However, not all grooves need to have necessarily exactly the same dimensions of reinforcement as long as being within the scope of the claimed invention.

In another embodiment, at least two opposite sidewall layers of a reinforced groove have essentially the same uniform thickness and/or at least two opposite sidewall layers of a reinforced groove have essentially the same length when the tread is unworn (measured perpendicularly to the circumferential direction).

In still another embodiment, at least one of the sidewall layers and a line connecting an axial edge of the top side and an axial edge of the base side at said sidewall layer intersect with an angle of between 175° and 90°, optionally between 170° and 100°. This is again an example of the advanced supporting function.

In still another embodiment, the tread (and/or a tire comprising the tread) has an axially innermost side and an axially outermost side and the sidewall layers of (preferably at least two or three) reinforced grooves are thicker on an axially outer side of the groove compared to an axially inner side of the same groove. Such an arrangement can help to improve further the cornering stiffness and/or behavior of the tread. The thickness of each sidewall layer, as such, can still have an essentially uniform thickness which may be different for the two different sides of the groove.

In still another embodiment, the tread (and/or a tire comprising the tread) has an axially innermost side and an axially outermost side, wherein the sidewall layers of one or two axially outermost circumferential grooves are thicker than of another groove axially closer to the innermost side of the tread or tire. Such an arrangement can also help to improve further the cornering stiffness and/or behavior of the tread.

In yet another embodiment, the groove reinforcement compound has a Shore A hardness of at least 75, and is typically within the range of 75 to 100. In some cases the groove reinforcement compound will have a Shore A hardness which is within the range of 80 to 95 and an elongation at break of at least 300%. The tread cap compound will normally have a Shore A hardness which is within the range of 40 to 80 with the Shore A hardness of the groove reinforcement compound being higher than the Shore A hardness of the tread cap compound. This may help to improve cornering stiffness while keeping driving comfort and/or noise at an acceptable level.

In another embodiment of the tread, the tread cap rubber compound has a Shore A hardness from 45 and 80 and the groove reinforcement rubber compound has a Shore A hardness from 70 to 100 and, optionally, a tread base layer rubber compound has a Shore A hardness from 15 to 55. The Shore A hardness of the groove reinforcement rubber compound is higher than the Shore A hardness of the tread cap compound while the Shore A hardness of the tread cap compound is higher than the Shore A hardness of the tread base layer compound. Such a distribution of stiffnesses of said three tread compounds is desirable to provide stiff grooves as well as a relatively soft base which supports better driving comfort at limited tread wear.

In another embodiment, the tread cap rubber compound has a Shore A hardness from 50 to 65 and the base layer has a Shore A hardness from 15 to 50, optionally from 15 to 45 or even from 20 to 40. Such a combination can further reduce noise generation and/or increase driving comfort.

In another embodiment, the groove reinforcement has a Shore A hardness from 75 to 100, optionally from 80 to 100 or from 80 to 99. Such values of relatively high stiffness are most desirable for the groove reinforcement compound. In general, it is also possible that the groove reinforcement is as such reinforced by fiber material within the compound.

In another embodiment, the groove reinforcement is essentially free of fibers.

In another embodiment, the Shore A hardness of the tread cap compound is at least 5%, 10%, 15%, 20%, or even 25% lower than the Shore A hardness of the groove reinforcement compound and/or the Shore A hardness of the base layer compound is at least 5%, 10%, 15%, 20%, or 25% lower than the Shore A hardness of the tread cap compound. Alternatively, or in addition, the above values could be at most 30% lower than mentioned above.

In still another embodiment, the tread base layer extends at least over the axial width of the radially inner bottom of the tread cap. This can further increase the effects of the desired combination of compounds.

In still another embodiment, the groove reinforcement extends at least over an axial width of one, two, three or more grooves and/or all grooves. However, even if the groove reinforcement extends over the width of multiple grooves (and may be considered to have a comb-like cross section), the ribs or blocks have in general still the tread cap compound in a central portion.

In yet another embodiment, the tread base layer supports the outer axial ends of the tread cap or in other words supports the tread cap in the shoulder region of the tire.

In yet another embodiment, the groove reinforcement extends at its radially inner portion over from 30% to 60% of the width of the tread base layer.

In still another embodiment, the base layer has at one or both of its axial ends a skirt (or wing) portion in which the base layer is radially thicker than in an area axially closer or adjacent to the equatorial plane (EP) of the tire. In other words, in the skirt portion, the radial thickness of the (relatively soft) base layer is larger than radially below (an area of) the grooves. This can help to soften the shoulder region and reduce noise.

In still another embodiment, the radial thickness of the base layer radially below the grooves is at most 20% of the radial distance between the bottom of a center groove and the radially inner side of the base layer. This is desirable for the stability of the tire in the claimed combination of hardness properties.

In yet another embodiment, in a portion of at least one shoulder region of the tread (in a cushion portion), the radial thickness of the base layer is between 110% and 40%, optionally between 90% and 50%, of the radial distance between the bottom of a center groove and the radially inner side of the base layer. This arrangement can act as a cushion in the shoulder region with lower hardness than in the radially above arranged tread cap material. A center groove may be either a groove contacting the equatorial plane of the tire or the axially next groove to the equatorial plane of the tire. In case of two equally distant grooves with respect to the equatorial plane with same depth either one of them may be considered, in case of two equally distant grooves with different depths, the deeper groove may be considered, e.g. the groove with the smaller radial distance between its bottom and the radially inner side of the tread base layer.

In yet another embodiment, a circumferential groove, being closer to the equatorial plane than another circumferential groove, may have a groove reinforcement with a higher Shore A hardness, than the groove reinforcement of said other groove. In particular, one or more groove reinforcements adjacent the equatorial plane of the tire may comprise a compound having a Shore A hardness from 75 to 100 while other grooves axially or laterally further away from the equatorial plane of the tire have a Shore A hardness of from 60 to 80. This arrangement of grooves reinforcements with decreasing hardness in the lateral direction from groove to groove may further help to balance the properties of the tire tread. In particular, this may help to provide good cornering stiffness in the center of the tread while having softer material in the direction of the shoulder of the tire which may help to find a better compromise between stiffness, noise and/or damping.

In an embodiment, the base layer has a cushion portion between an axially outer edge of the base layer and the groove axially nearest to that edge, wherein the cushion portion extends axially over at least 30% (preferably at least 40%) of the distance $d_S$ between said axial outer edge of the base layer and said groove. In other words, the cushion portion may be considered as a circumferential portion of the base layer which has a larger thickness than a portion of the base layer adjacent the equatorial plane or in a portion radially below the grooves, respectively. The cushion portion may in general be made of the same material/compound as the rest of the base layer. Said distance $d_S$ may also be understood as the axial distance between the axially outer edge of the base layer and the radial projection of the groove bottom onto the radially inner side of the base layer, in particular the axially outer edge of the radial projection of the groove bottom onto the radially inner side of the base layer.

In another embodiment, the cushion portion may have a tapering and/or trapezoidal shape, e.g. tapering in the radial direction, having a smaller axial width at its radially outer side and a larger axial with at its radially inner side. Such an arrangement may be advantageous for stability reasons.

In still another embodiment, the radial thickness of the base layer is one or more of: in an axially outermost region of the base layer between 50% and 120% of the radial distance between a bottom of a center groove and the radial inner side of the base layer; in a second region axially inwards of said outer region between 10% and 20% of the radial distance between a bottom of a center groove and the radial inner side of the base layer; in a third region axially inwards of said second region between 50% and 110% of the radial distance between a bottom of a center groove and the radial inner side of the base layer; and in a fourth region axially inwards of said third region between 1% and 20% of the radial distance between a bottom of a center groove and the radial inner side of the base layer. Said axially outer portion could be absent in an alternative embodiment such that only the cushion portion axially inwards of the skirt region and the fourth portion are present.

Axially inwards or inner shall mean in general in the present application, axially closer to the equatorial plane of the tire. Axially outwards or outer is axially further from the equatorial plane of the tire. Axial direction means also a direction in parallel to the axis of rotation of the tire. Similarly, radially outwards or outer means further away from the axis of rotation of the tire and radially inwards or inner means closer to the tire's axis of rotation. The circumferential direction may be considered as rotation-symmetric to the axis of rotation of the tire. The terms center and central may be replaceable which each other in the present application. If deemed appropriate it would also be possible to make reference to the centerline of the tread instead of the equatorial plane of the tire or tread herein. Both terms are known to the person skilled in the art.

In another embodiment, the tread cap comprises at least two tread cap layers arranged radially on top of one another. Such tread cap layers may have different compounds with different properties. For instance, a radially lower tread cap layer could be stiffer than the radially upper cap layer. For instance, a radially inner tread cap layer may have a smaller rolling resistance than the radially outer cap layer. A radially outer tread cap layer may have a higher wet grip than the radially inner tread cap layer.

In another embodiment, the groove reinforcement covers the bottom of the adjacent groove (reinforced by the reinforcement) and at least a bottom portion of at least one of the sidewalls of said groove.

In another embodiment, the groove reinforcement extends from the radially outer surface of the tread (the surface contacting the road when driving) in a radially inner direction below the bottom of the reinforced groove or grooves, optionally down to the radially outer side of the base layer. In general, the groove reinforcement or reinforcements may extend in a radial direction below the bottom of the grooves. A portion of the tread cap layer could be between the reinforcement(s) and the tread base layer or one or more reinforcement(s) extend radially inwards to contact the tread base layer or one or more reinforcements extend radially inwards through the base layer to contact a tire belt or belt overlay.

In still another embodiment, at least one of the groove reinforcements extends from the radial outer surface of the tread through the base layer, wherein the groove reinforcement rubber compound comprises at least 40 phr carbon black. This may render the groove reinforcement sufficiently electrically conductive such that an electrically conductive path is provided from the tread surface to the belt region of the tire. This may be of particular interest in case the tread cap compound and/or the base layer compound does not comprise sufficiently conductive material, e.g. high silica compounds. Thus, the degree of design freedom is increased.

In still another embodiment, the elongation at break of the groove reinforcement rubber compound is larger than 300%, optionally smaller than 700%. Such a minimum for elongation at break helps to avoid groove cracks.

In general, the rubber compounds or compositions of the tread cap, base layer and the groove reinforcements may be different. It is also emphasized that the layers and components discussed herein are not part of the tire carcass or belt or belt overlays.

In one embodiment of this invention, one or more of the rubber compositions may include at least one and/or one additional diene-based rubber. Representative synthetic polymers may be the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g. acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized styrene-butadiene rubber (SBR), high cis-1,4-polybutadiene rubber (PBR), isoprene-butadiene rubber (IBR) and styrene-isoprene-butadiene rubber (SIBR). These rubbers can also optionally be silicon-coupled or tin-coupled star-branched polymers. The preferred rubbers or elastomers are generally natural rubber, synthetic polyisoprene rubber, polybutadiene rubber, and styrene-butadiene rubber (SBR), including SBR made by emulsion polymerization (ESBR) and SBR made by solution polymerization (SSBR).

Preferred rubber or elastomers may be in general natural rubber, synthetic polyisoprene, polybutadiene and SBR including SSBR. In another embodiment, the composition may comprise at least two diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers. In another embodiment, solution polymerization prepared SBR (SSBR) may be used. Such an SSBR may for instance have a bound styrene content in a range of 5% to 50%, preferably 9% to 36%, a frequently 24% to 32%, by weight. The SSBR can be conveniently prepared, for example, by anionic polymerization in an inert organic solvent. More specifically, the SSBR can be synthesized by copolymerizing styrene and 1,3-butadiene monomer in a hydrocarbon solvent utilizing an anionic initiator, such as organo lithium compound (isobutyl lithium).

In one embodiment, a synthetic or natural polyisoprene rubber may be used. Synthetic cis 1,4-polyisoprene and cis 1,4-polyisoprene natural rubber are as such well known to those having skill in the rubber art. In particular, the cis 1,4-content may be at least 90%, optionally at least 95%, and frequently at least 96%. In one embodiment, cis 1,4-polybutadiene rubber (BR or PBD) is used. Suitable polybutadiene rubbers may be prepared, for example, by organic solution polymerization of 1,3-butadiene. The BR may be conveniently characterized, for example, by having at least a 90 percent cis 1,4-content and a glass transition temperature (Tg) in a range of −95° C. to −105° C. Suitable polybutadiene rubbers which are available commercially from The Goodyear Tire & Rubber Company include Budene® 1207 high cis-1,4-polybutadiene rubber, Budene® 1208 high cis-1,4-polybutadiene rubber, and Budene® 1280 high cis-1,4-polybutadiene rubber. These high cis-1,4-polybutadiene rubbers can be synthesized utilizing nickle catalyst systems which include a mixture of (1) an organonickel compound, (2) an organoaluminum compound, and (3) a fluorine containing compound as described in U.S. Pat. Nos. 5,698,643 and 5,451,646. The teachings of U.S. Pat. Nos. 5,698,643 and 5,451,646 are incorporated herein by reference.

A reference to a glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute.

The term "phr" as used herein, and according to conventional practice, refers to "parts by weight of a respective material per 100 parts by weight of rubber, or elastomer." In general, a composition comprises 100 parts of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 to 10 phr, optionally from 1 to 5 phr of one or more additional diene-based rubbers, such as SBR, SSBR, ESBR, PBD/BR, NR and/or synthetic polyisoprene. In another example, the composition may include less than 5 phr, preferably less than 3 phr of an additional diene-based rubber or be also essentially free of such an additional diene-based rubber. The terms "compound" and "composition" may be used herein interchangeably, unless indicated otherwise.

In an embodiment, the rubber composition may also include oil, in particular processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

In an embodiment, the rubber composition may include silica. Commonly employed siliceous pigments which may be used in the rubber compound include for instance conventional pyrogenic and precipitated siliceous pigments (silica). In one embodiment, precipitated silica is used. The conventional siliceous pigments may be precipitated silicas such as, for example, those obtained by the acidification of a soluble silicate, e.g., sodium silicate. Such conventional silicas might be characterized, for example, by having a BET surface area, as measured using nitrogen gas. In one embodiment, the BET surface area may be in the range of 40 to 600 square meters per gram. In another embodiment, the BET surface area may be in a range of 80 to 300 square meters per gram. The BET method of measuring surface area is described in the Journal of the American Chemical Society, Volume 60, Page 304 (1930). The conventional silica may also be characterized by having a dibutylphthalate (DBP) absorption value in a range of 100 to 400, alternatively 150 to 300. Conventional silica typically has an average ultimate particle size which is in the range of 0.01 to 0.05 micron as determined by the electron microscope, although the silica particles may be even smaller, or possibly larger, in size. Ranges of silica use could be for instance between 5 phr and 120 phr, preferably in a range of between 20 phr and 70 phr or 80 phr to 120 phr. Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

In an embodiment, the rubber composition may include carbon black. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 to 145 g/kg and DBP number ranging from 34 cm³/100 g to 150 cm³/100 g.

In one embodiment the rubber composition may contain a conventional sulfur containing organosilicon compounds or silanes. Examples of suitable sulfur containing organosilicon compounds are of the formula:

$$Z\text{-Alk-}S_n\text{-Alk-}Z \qquad \qquad I$$

in which Z is selected from the group consisting of

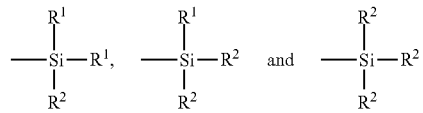

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

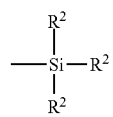

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(\!=\!O)\!-\!S\!-\!CH_2CH_2CH_2Si(OCH_2CH_3)_3$, which is available commercially as NXT™ from Momentive Performance Materials. In another embodiment, suitable sulfur containing organosilicon compounds include those disclosed in U.S. Pat. No. 6,849,754 B2. The teachings of U.S. Pat. No. 6,849,754 are incorporated herein by reference for the purpose of teachings suitable sulfur containing organosilicon compounds that be employed in the practice of this invention. In one embodiment, the sulfur containing organosilicon compound is Si-363 from Degussa AG of Duesseldorf, Germany. The amount of the sulfur containing organosilicon compound in a rubber composition may vary depending on the level of other additives that are used. Generally speaking, the amount of the compound may range from 0.5 phr to 20 phr. In one embodiment, the amount will range from 1 phr to 10 phr.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur.

The sulfur-vulcanizing agent may be used in an amount ranging from 0.5 phr to 8 phr, alternatively with a range of from 1.5 phr to 6 phr. Typical amounts of tackifier resins, if used, comprise for example 0.5 phr to 10 phr, usually 1 phr to 5 phr. Typical amounts of processing aids, if used, comprise for example 1 phr to 50 phr (this may comprise in particular oil). Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e., primary accelerator. The primary accelerator(s) may be used in total amounts ranging from 0.5 phr to 4 phr, alternatively 0.8 phr to 1.5, phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one non-productive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature between 140° C. and 190° C. The appropriate duration of the thermomechanical working varies as a function of the operating conditions, and the volume and nature of the components. For example, the thermomechanical working may be from 1 to 20 minutes.

Vulcanization of the pneumatic tire of the present invention may for instance be carried out at conventional temperatures ranging from 100° C. to 200° C. In one embodiment, the vulcanization is conducted at temperatures ranging from 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In a second aspect of the invention, a tire is provided, the tire having a tread in accordance with one or more of the embodiments mentioned herein. In particular, the tire may have a tread comprising a tread cap comprising a first rubber compound for contacting the road when driving, at least one circumferential groove reinforcement forming at least one of the grooves in the tread cap, the groove reinforcement comprising a second rubber compound for reinforcing an area adjacent the grooves formed by the groove reinforcement, wherein the groove reinforcement comprises for at least one of the grooves formed by the groove reinforcement two groove sidewall layers, each sidewall layer extending from the outer radial surface of the unworn tread down into the direction of the bottom of the groove formed by the groove reinforcement and wherein each sidewall layer has an essentially uniform thickness along its length. Furthermore, the groove reinforcement comprises a groove support portion forming a bottom portion of the groove and having a radially inner base side as well as a radially outer top side, wherein the groove support portion tapers from its base side to its top side.

Advantages of the tire comprising a tread in accordance with an aspect of the invention or one of its embodiments or combinations thereof have already been indicated above.

It is emphasized that one or more embodiments, or features thereof, may be combined with each other within the scope of the present invention.

The tire could for example be a pneumatic tire, in particular a pneumatic radial and/or passenger car tire.

BRIEF DESCRIPTION OF THE DRAWINGS

The structure, operation and advantages of the invention will become more apparent upon contemplation of the following description taken in conjunction with the accompanying drawings, wherein:

FIG. 1 represents a schematic cross section of a tire tread comprising a groove reinforcement in accordance with the prior art;

FIG. 2 represents a schematic cross section of a tire tread comprising a groove reinforcement in accordance with another prior art example;

DETAILED DESCRIPTION OF THE EMBODIMENTS

Figure 3:
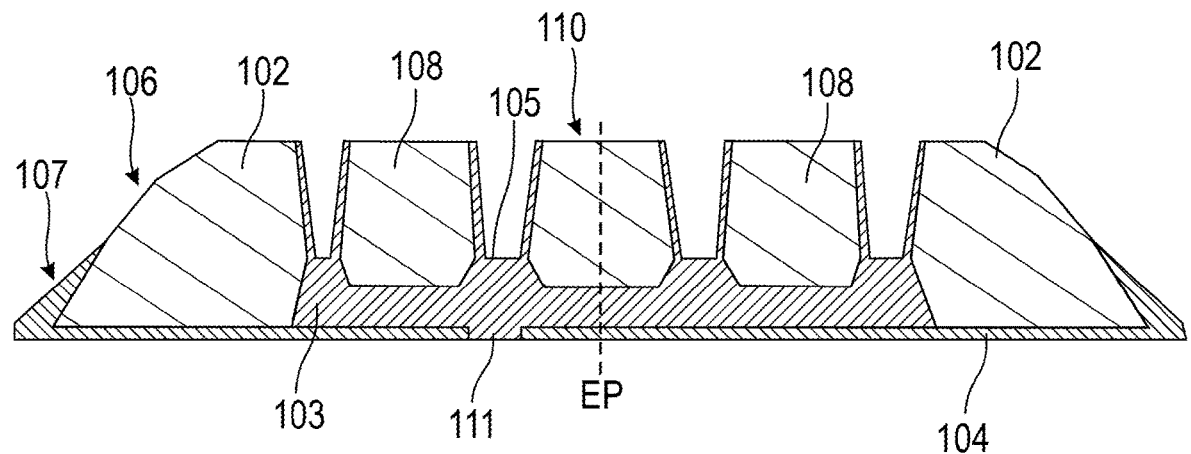
FIG. 3 is a schematic cross section of a tire tread in accordance with a first embodiment in accordance with the present invention.

FIG. 1 shows a schematic cross section of a tire tread 10 in accordance with the prior art. Tread 10 has a tread cap 2 with a plurality of circumferential ribs and/or tread blocks 8 between circumferential grooves 5. Moreover, said tread 10 has a tread base 4. The tread base 4 or tread base layer 4 is made of a different compound than the cap 2 and it supports the tread cap 2 on a radially inner side of the tread 10. The tread base layer 4 has also extensions in axially outer regions 7 of the shoulder regions 6 of the tire, in other words in the skirt regions 7 of the tread 10. The grooves 5 are reinforced by a plurality of axially or laterally separated groove reinforcements 3. In other words, the groove reinforcements form or encase the bottoms of the grooves 5 as well as at least parts of their sidewalls, i.e. the sidewalls of the ribs or blocks 8. The portions of the groove reinforcements 3 covering the groove sidewalls are tapering and have a decreasing thickness along their length in an outer radial direction. The equatorial plane EP of the tire tread is indicated by dashed lines. Although FIG. 1 describes prior art, and for the sake of simplicity, the description of elements also present in figures in accordance with embodiments of the invention may apply also to these embodiments and their understanding.

FIG. 2 shows a schematic cross section of another prior art tread 10'. In contrast to FIG. 1, the groove reinforcement 3' is formed integrally over the axial width of multiple grooves. Again, the portions of the groove reinforcement 3' covering the sidewalls of the ribs or parts thereof do not have an essentially uniform thickness along their length but taper in an outer radial direction.

FIG. 3 shows a first example of a tread 110 in accordance with the invention. The tread 110 has a tread cap made of tread cap compound 102, a plurality of tread blocks and/or ribs 108 largely made of tread cap compound 102, a shoulder portion 106, a skirt portion 107 and a plurality of circumferential tread grooves 105 which are formed in the tread cap by the groove reinforcement 103. In other words, one may also say that the groove reinforcement 103 is embedded in the tread cap 102. Radially below the tread cap 102 there is a tread base layer 104 supporting the radially above groove reinforcement 103 and tread cap 102. In contrast to the prior art discussed herein, the groove reinforcement in accordance with the present example of the invention comprises layers of essentially uniform thickness forming the groove sidewalls as further discussed in the detailed view of FIG. 4. Optionally, and in general, the groove reinforcement 103 may have a portion 111 extending in a radially inner direction through the tread base layer 4. This may be of particular interest when the groove reinforcement is electrically conductive such that the groove reinforcement may serve as electrically conductive passage from the tread's surface to a belt area of the tire which is radially below the tread base layer. For example, the groove reinforcement compound may have a carbon black amount of more than 40 phr, thereby rendering the compound sufficiently electrically conductive. This may be of particular interest if the tread cap and/or base layer compounds are high silica compounds which are not as such sufficiently electrically conductive. Such a conductive passage could also be provided in other embodiments of the invention.

In the example shown in FIG. 3, the tread 110 has only one reinforcement covering multiple adjacent grooves 105. However, the tire could have multiple groove reinforcements which do not form an integral reinforcement as also shown in other parts of the present disclosure.

The three compounds in the example of FIG. 3 may all exhibit a different level of stiffness. In particular, the groove reinforcement 103 may be relatively stiff, the compound of the cap 102 softer and, as another option, the compound of the tread base 104 even softer than the compound of the tread cap 102. This arrangement can help to advantageously balance the behavior of the tread 110. For instance, the stiffness of the groove reinforcement may help to improve the cornering stiffness and/or tread wear characteristics of the tire. At the same time, the tread cap compound can have desired grip properties and has a moderate stiffness between the stiffness values of the groove reinforcement 3 and the base layer 4.

In addition to the above-mentioned different stiffness values, the shape and or extension of the reinforcement 3, cap compound 2 and base layer 4 can help to further improve the above-mentioned effects. Further examples are given in the description of FIG. 12.

In the example of FIG. 3, and in other examples mentioned herein, the groove reinforcement 103 extends from the radially outermost surface of the tread 110 beyond the bottom of the grooves 105 into the direction of the base layer 104. The groove reinforcement 103 is integrally formed over the axial width of multiple grooves 105, in this example over all four grooves 105.

Figure 4:
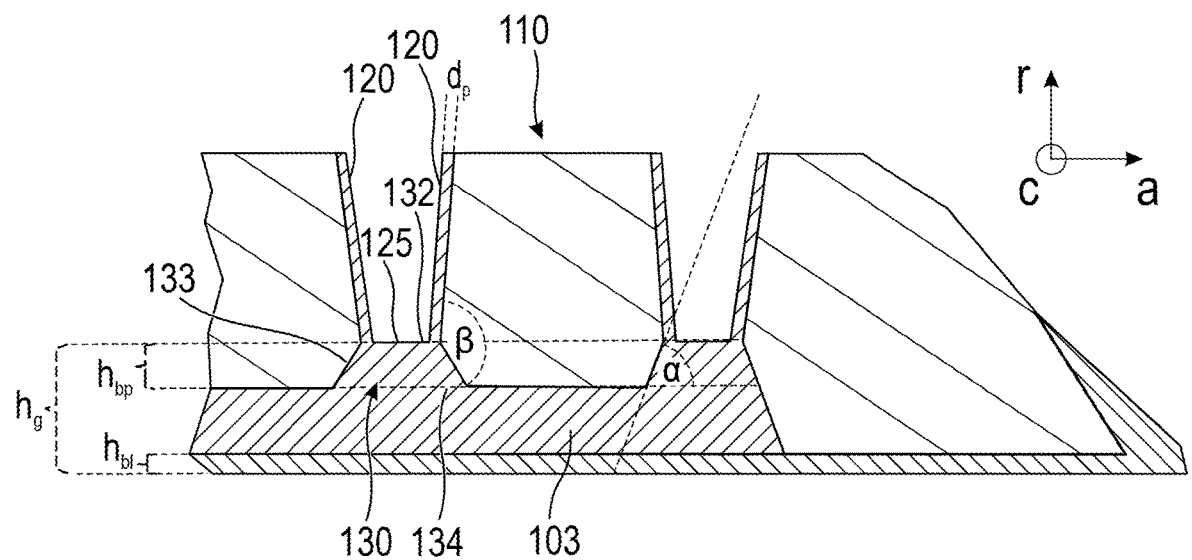
FIG. 4 is showing a detail of the embodiment shown in FIG. 3.

FIG. 4 shows a detail of the tread 110 already depicted in FIG. 3. The thickness $d_p$ of the sidewall layers 120 of the groove reinforcement 103 (extending in the circumferential direction c) is constant over the height of the groove, in this specific example down to the bottom 125 of the reinforced groove. The groove reinforcement 103 has below the bottom 125 of the reinforced grooves 105 a support portion 130 which has a top side 132, in this example forming the bottom of the groove and a base side 134, wherein the support portion 130 tapers from the bottom side 134 to the top side 132. Both sides 132, 134 are interconnected at their lateral edges by lateral sides 133. The lateral sides have in the example an angle α between an axial direction a or the axial base side 134 which is smaller than 90°. In other words, the groove support portion 130 tapers from its base side 134 to its top side 132. The support portion 130 may for example have a radial height of $h_{bp}$ which is at least 15% or 20% of the distance $h_g$ between the bottom 125 of the groove and the inner radial side of the tread base layer 104 measured radially below the reinforced groove 105. As the support portion 130 of the groove reinforcement 103 tapers in an outer radial direction r, there is an angle θ between the lateral side 133 of the support portion 130 and the sidewall layer 120 of the groove reinforcement which is smaller than 180°, preferably smaller than 175° which improves support of the groove 105. While in the example of FIG. 4 the support portion 130 extends in an outer radial direction until the bottom 125 of the reinforced groove 105, this extension could be different as for instance shown in the example of FIG. 5.

FIG. 4 indicates schematically the radial direction r, the circumferential direction c and the axial direction a. It shall be understood that the axial direction a extends in two orientations. In general, the terms radial, axial and circumferential are used as common in the field of tires. In particular, the term circumferential shall be understood as the circumferential direction of a tire.

Figure 5:
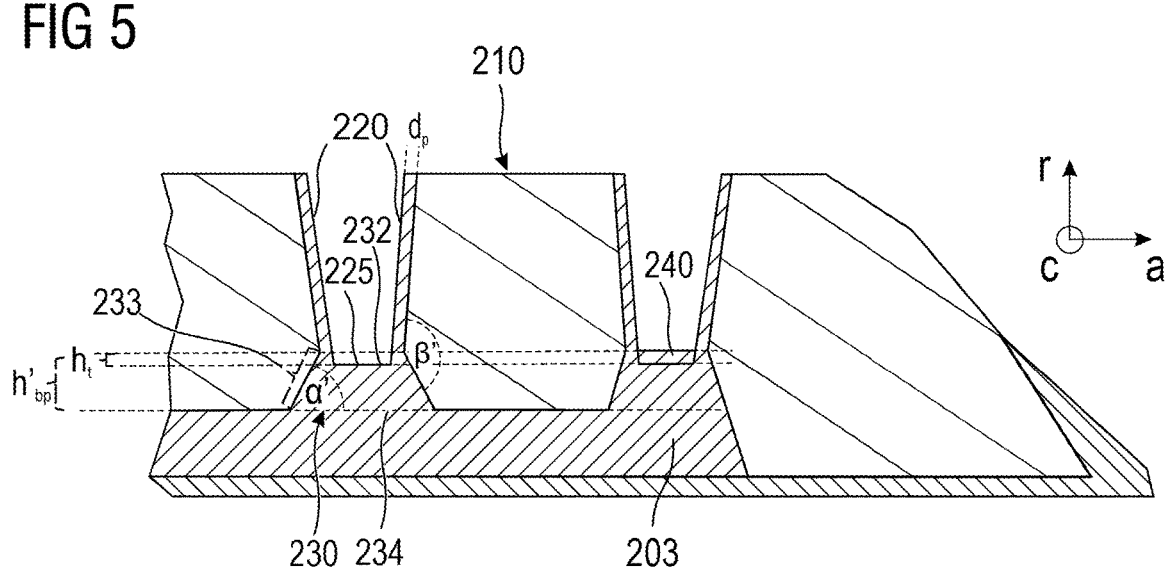
FIG. 5 shows a part of a cross section of a tire tread in accordance with another embodiment of the present invention with support portions of the groove reinforcement extending up to the height of a tread wear indicator.

FIG. 5 shows another partial cross section of a tire tread 210 in accordance with another example of the present invention. In contrast to the embodiment shown in FIG. 4, the groove reinforcement 203 of FIG. 5 has a support portion 230 which extends in an outer radial direction r essentially up to a tread wear indicator (TWI) height. For the sake of clarity, a tread wear indicator 240 has only been shown in an adjacent groove. Such an indicator could have the radial height $h_t$ of 1.6 mm, or between 1.4 mm and 1.8 mm. It is emphasized that the support portion 230 could also extend radially beyond the tread wear indicator 240 (e.g. up to 1 mm above the tread wear indicator 240). In other words, the sidewall layers 220 could extend (with essentially uniform thickness) from the radially outer surface of the tread 210 at least down to a position which is about 1 mm radially above the tread wear indicator 240. This may still allow relatively uniform wear and performance until the tire is almost worn down to the tread wear indicator's upper surface. Independent of how the present invention is implemented, a main idea is to provide groove reinforcement sidewall layers which are essentially uniform in thickness during wear of the tire. This is in contrast to prior art which has typically tapering shapes of the reinforcement of the groove reinforcement or even no reinforcement at all in a portion close to the outer surface of the tread. Compared to the embodiment shown in FIG. 4, the support portion 230 of FIG. 4 with its base side 234 and top side 232 connected by lateral sides 233 is thicker in the radial direction as indicated by height $h'_{bp}$. In particular, the groove support portion 230 extends radially beyond the bottom of the groove 225.

Figure 6:
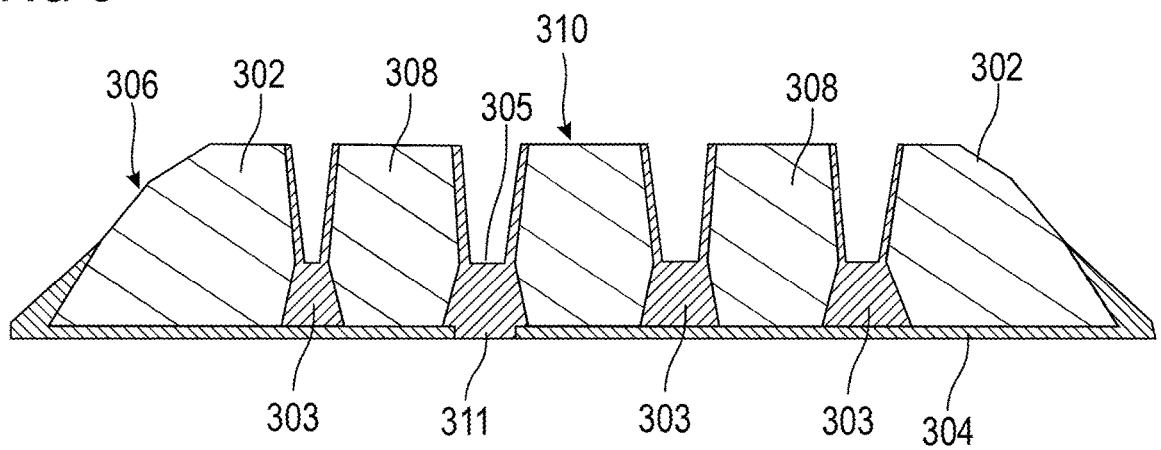
FIG. 6 shows a cross section of another embodiment of a tire tread in accordance with another embodiment of the present invention which has a plurality of separate groove reinforcements.

FIG. 6 shows yet another embodiment of a tread 310 in accordance with the present invention. Similar to the embodiment of FIG. 3, it has a tread cap having a shoulder region 306, ribs/blocks 308, grooves 305, a base layer 304, and a conductive passage 311. In contrast to the embodiment of FIG. 3, the embodiment of FIG. 6 has a plurality of separate groove reinforcements 303 having each a support portion supporting two opposing sidewall layers of the groove reinforcement 303 and forming the reinforced groove 305. Although not indicated in FIG. 6, the support portions could extend until or above an upper side or a tread wear indicator as shown in the context of FIG. 5. Typically, the base side of the support portion is axially at least 50% broader than the bottom of the reinforced groove 305. For instance, the support portion extends essentially in a radial inner direction down to the upper side of the base layer 304.

Figure 7:
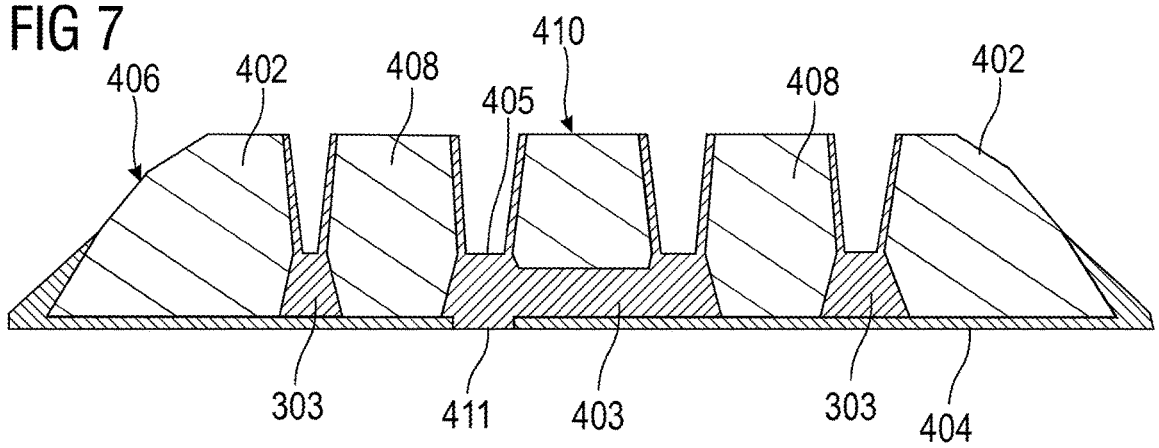
FIG. 7 shows a cross section of another embodiment of a tire tread in accordance with still another embodiment of the present invention, having a plurality of groove reinforcements, with one reinforcement extending over the axial width of two grooves.

FIG. 7 shows yet another embodiment of a tread 410 in which the two center grooves 405 are reinforced by a mutual reinforcement 403 extending over the axial width of both grooves. Separately from that reinforcement there are two single reinforcements 303, each reinforcing one of the axially outer grooves. Apart from that, tread 410 has also the tread cap with tread cap compound 402, shoulder regions 406, ribs/blocks 408, a conductive passage 411 through the base layer 404, as also shown in other embodiments herein.

Figure 8A:
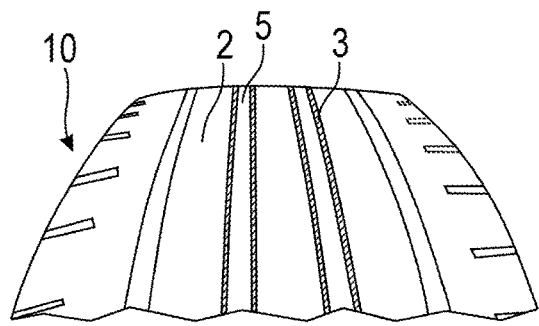
FIG. 8a shows a schematic partial top view of an unworn tire tread of the prior art tread shown in FIG. 1.
Figure 8B:
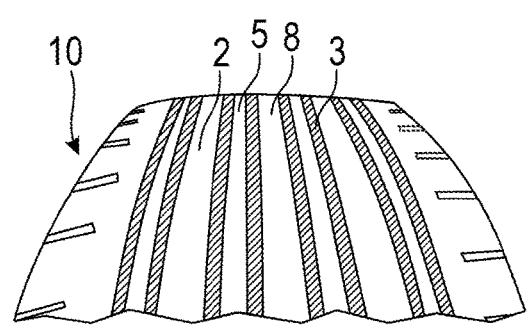
FIG. 8b shows a schematic partial top view of a worn tire tread of the prior art tread shown in FIG. 1.

In order to further demonstrate some effects of the present invention in comparison with the prior art, FIGS. 8 and 9 show top views of a tire tread of prior art tires and a tire in accordance with an embodiment of the present invention. In particular, FIG. 8 shows top views of an unworn tread 10 (FIG. 8a) and the same tread 10 in a worn state (FIG. 8b) of the prior art tread already shown in FIG. 1. As visible in FIG. 8a, the unworn surface of the tread 10 shows almost only the tread cap with tread cap compound 2. Only the two center grooves 5 show adjacent circumferential stripes of groove reinforcement compound of the groove reinforcements 3. When the same tread 10 is worn, the image appears different as shown in FIG. 8b. Now all four grooves 5 have on each side the groove reinforcement compound of the groove reinforcement 3 broadly visible such that the remaining width of the tread cap compound of the tread cap between the grooves 5, i.e. in the area of the ribs 8 is axially smaller than in the unworn state. This may have however an undesirable impact on the properties and/or performance of the tire. In particular, the properties of the tread surface at the interface between the road and the tire may change significantly.

Figure 9A:
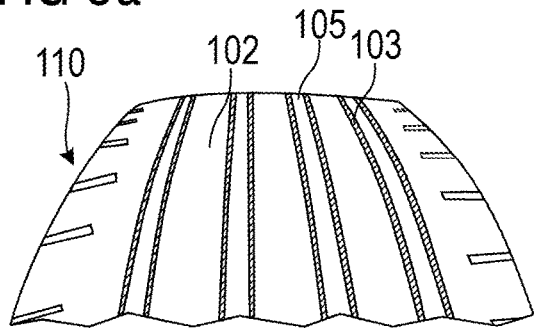
FIG. 9a shows a schematic partial top view of an unworn tire tread in accordance with the example of the invention in accordance with FIG. 3.
Figure 9B:
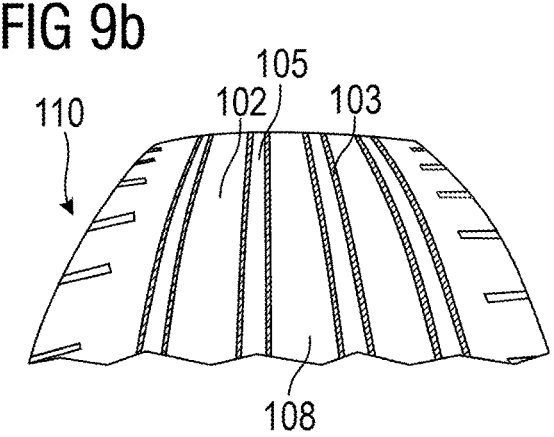
FIG. 9b shows a schematic partial top view of a worn tire tread in accordance with the example of the invention in accordance with FIG. 3.

FIG. 9 refers to the embodiment of FIG. 3 which is an example in accordance with the present invention. FIG. 9a shows a schematic top view of the unworn tread 110 and FIG. 9b of the worn tread 110. As visible in FIG. 9a, all four grooves 105 have on each of their lateral sides a sidewall layer of groove reinforcement material of the groove reinforcement 3. Tread ribs are made of the cap compound of the cap 102. Turning now to FIG. 9b, there is no significant change compared to FIG. 9a visible. In contrast to the change in FIG. 8b compared to FIG. 8a there is no significant change in the lateral tread cap compound width in the ribs 108 in FIG. 9b compared to FIG. 9a. All four grooves 105 are still axially encased by the reinforcement 103.

Figure 10:
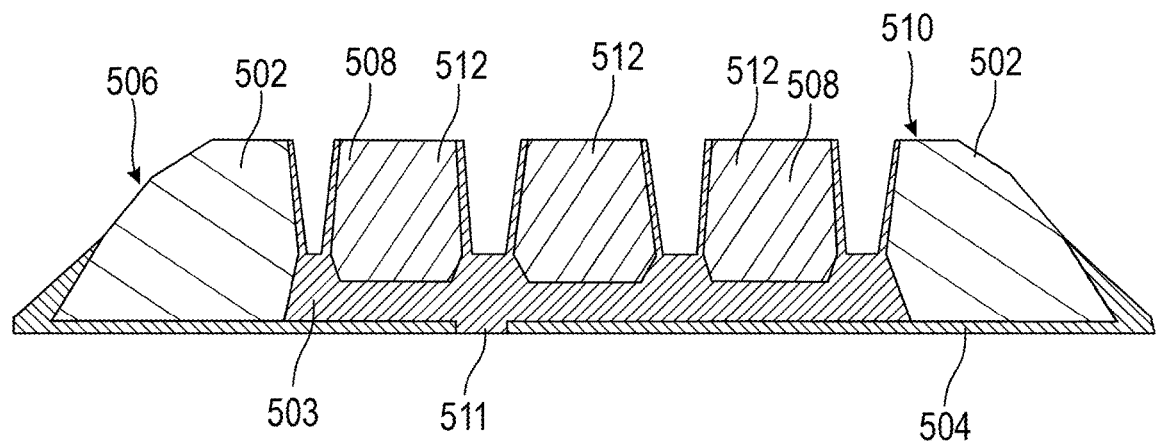
FIG. 10 shows a schematic cross section of a tire tread in accordance with still another embodiment of the invention, in which the tread cap compound in the three center ribs is different from the tread cap compound in a shoulder area of the tire.

FIG. 10 shows another cross-sectional view of another embodiment of a tread 510 in accordance with the present invention. Most elements of the embodiment are similar to those already discussed in relation to FIG. 3. Thus, the tread 510 has a tread cap, shoulders 506, ribs/blocks 508, a reinforcement 503, a conductive passage 511 as well as a base layer 504. As a difference over other embodiments discussed herein, the tread cap compound 512 in the three central ribs 508 is different from the tread cap compound 502 in the shoulder area. However, the center ribs are still covered by the sidewall layers made of groove reinforcement compound. In general, one, two, three, four or a plurality of center ribs may comprise a different compound than shoulder ribs while reinforced by the sidewall layers of the groove reinforcement. In this embodiment (but also in other embodiments mentioned herein), the groove reinforcement 503 encases also the compound of the center ribs. This may be of particular interest if the rib compounds tends to smear out of its initial position during molding and/or curing. In many cases, it shall be avoided that the material of the cap compound gets into the grooves or in particular to the groove bottom where it may trigger cracks over the lifetime of the tire. The essentially uniform layer of groove reinforcement compound extending from the top of the tread avoids such undesired behavior.

Figure 11:
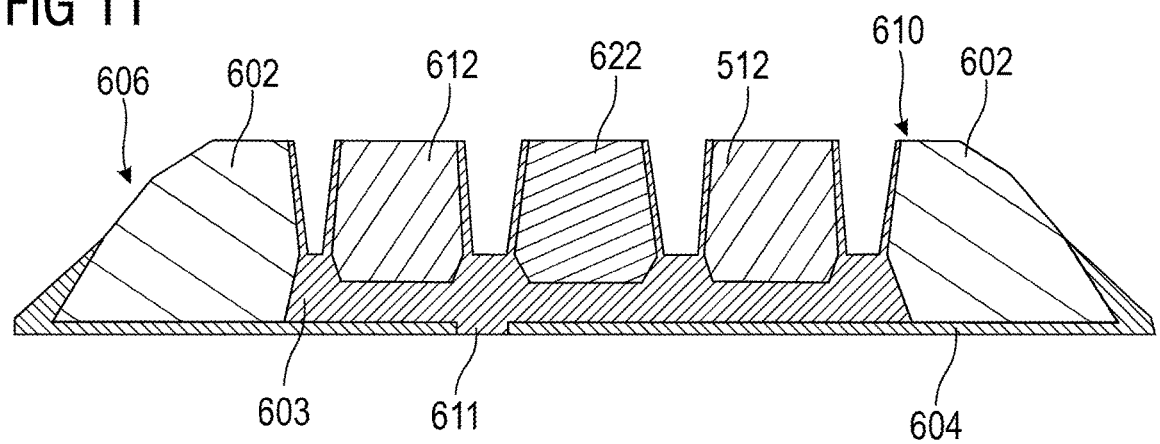
FIG. 11 shows a schematic cross section of a tire tread in accordance with still another embodiment of the invention, in which the tread cap compound in the center rib is different from the tread cap compound in the two adjacent ribs and both said tread cap compounds being different from the tread cap compound in the shoulder ribs.

FIG. 11 discloses a tread 610 with similar arrangement as shown in FIG. 10 with the main difference of having a third cap compound in the tread 610. In particular, the center rib comprises a first tread cap compound 622 while the two laterally adjacent ribs have a different, second tread cap compound 612 and the shoulder ribs even a further, third tread cap compound 602. Apart from this difference the tire has shoulder regions 606, a groove reinforcement 603, a conductive passage 611, a base layer 604.

Figure 12:
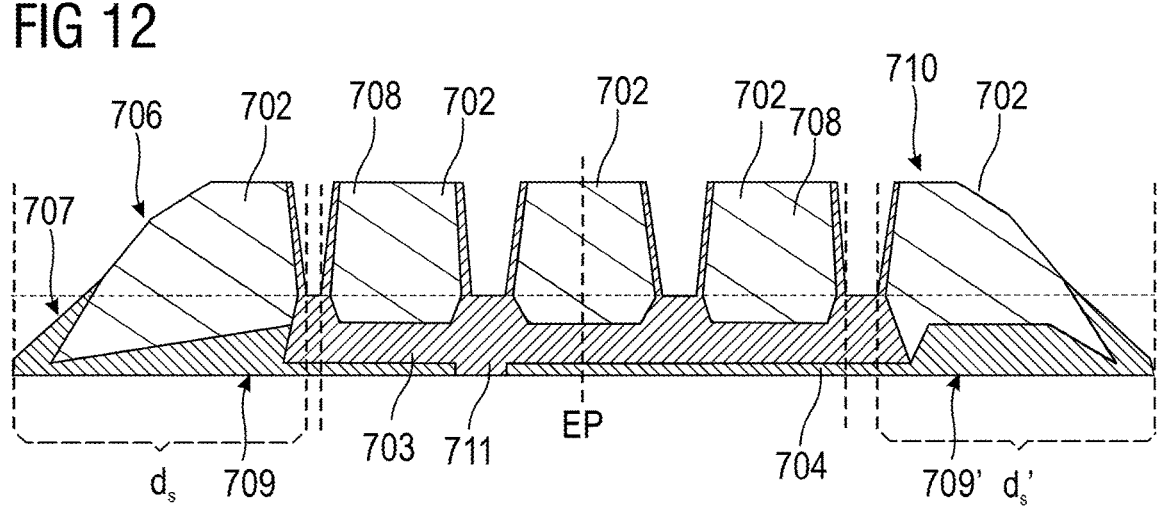
FIG. 12 shows another schematic cross section of a tire tread similar to the embodiment shown in FIG. 3 but having a tread base layer with cushion portions in the shoulder area of the tire.

As shown in FIG. 12, the tread 710, still in accordance with an example of the invention, has a special base layer 704 in its construction. While the tread cap 702, radially upper areas of the shoulder regions 706, ribs/blocks 708, the groove reinforcement 703 and the conductive passage 711 are similar to the corresponding elements previously described with reference to FIG. 3, the base layer 704 has a different shape. The shape of the base layer 704 and its properties are described in more detail herein below. In particular, the base layer 704 has portions which extend in a radially outer direction in the skirt area 707 of the tire. These areas have an essentially triangular cross-sectional shape and could also be described as wings. The base layer 704 may have a relatively small radial thickness in an axial center portion of the tire, e.g. less than 15% or less than 10% of the maximum radial tread thickness of the tread base layer 704 or less than 30%, or preferably less than 20%, of the radial distance between the bottom of the axial center groove(s) to the radially inner side of the base layer 704 at the respective position. The tread base layer 704 has also a radially thicker portion, called here a cushion or cushioning portion 709, 709' between the central thin portion and the axially outermost region of the tread base 704 or tread 710.

The cushion portion 709, 709' has a (maximum) thickness which is about between 110% and 30%, preferably between 95% and 50%, of the radial distance between the groove bottom of the center groove(s) and the radially inner side of the base layer 704 at the respective position of the groove(s). The cushion portion 709, 709' may extend axially over at least 30% (preferably at least 40% and/or at most 80%) of the distance $d_S$, $d_S'$ between an axial outer edge of the base layer 704 in the shoulder region 706 and the groove closest to that shoulder region 706. In other words, the cushion portion 709, 709' may be considered as a circumferential portion of the base layer 704 which has a larger thickness than a portion of the base layer 704 adjacent the equatorial plane or in a portion radially below the grooves. In the example of FIG. 12, each of the two shoulders of the tire has a cushion portion 709, 709' with a different shape. The tire could also have the same shape of the cushion portion 709, 709' on both sides instead. Said distance $d_S$, $d_S'$ (as indicated in FIG. 12) may also be understood as the axial distance between the axially outer edge of the base layer 704 and the radial projection of the groove bottom onto the radially inner side of the base layer 704.

The cushion portion 709' may have essentially a trapezoidal shape having a radially inner broader support portion and a radially outer narrower portion. In other words, the cushion portion may taper in the radial outer direction. Similarly, the base layer 704 may taper in the skirt portion 707 in the radially outer direction. Moreover, the base layer 704 may extend in the skirt portion 707 beyond the maximum radial thickness of the cushion portion 9 as shown in FIG. 12. As shown for cushion portion 709, the latter may also have an essentially triangular shape and/or may increase in radial thickness from the adjacent skirt portion 707 towards the adjacent groove reinforcement 703 supporting the adjacent groove.

While the present invention does not focus on the chemical composition of the tread compounds in the groove reinforcement, tread cap compounds or tread base layers, a few examples are given herein below. Those shall however not be understood as necessarily limiting the invention to these examples. In this context, Table 1 provides examples of suitable base layer compounds. However, it shall be re-emphasized that the main focus of the invention is not directed to the specific compounds used. These base layer compound examples shall not automatically limit the invention.

TABLE 1

Base layer compound examples

| Sample number | i | ii | iii | iv |
|---|---|---|---|---|
| Polybutadiene | 65 | 50 | 0 | 0 |
| Natural Rubber | 35 | 50 | 100 | 100 |
| Carbon Black | 50 | 45 | 0 | 0 |
| Pre-Silanized Silica[1] | 0 | 0 | 30 | 30 |
| Phenol Formaldehyde resins | 3 | 0 | 5 | 5 |
| TDAE Oil | 11.3 | 16 | 10 | 45 |
| Waxes | 2 | 1.5 | 3.8 | 3.8 |
| Antidegradants | 7 | 5.5 | 6.7 | 6.7 |
| Stearic Acid | 1 | 0.75 | 1 | 1 |
| Sulfenamide Accelerator | 0.6 | 1.4 | 0.9 | 0.9 |
| Zinc oxide | 3.5 | 2 | 2 | 2 |
| Sulfur | 2.8 | 1.9 | 2.5 | 2.5 |

[1]Agilon 400 ® pre-silanized silica from PPG Industries.

Table 2 shows Shore A hardness values of the samples shown above in Table 1.

TABLE 2

Base layer compound examples

| Sample number | i | ii | iii | iv |
|---|---|---|---|---|
| Shore A Hardness [a] | 49 | 54 | 29 | 17 |

[a] Shore A hardness measured according to ASTM D2240.

Table 3 gives examples of suitable tread cap compounds. As mentioned already in the context of tread base layer compounds, it is emphasized again that such tread cap compounds mentioned herein are essentially considered as examples while other tread cap compounds could be used as long as they fall within the scope of the present invention.

TABLE 3

Tread cap compound examples

| Sample number | v | vi | vii |
|---|---|---|---|
| Functionalized SSBR [1] | 60 | 49 | 0 |
| Natural Rubber | 40 | 21 | 60 |
| ESBR[2] | 0 | 0 | 40 |
| Non-functionalized SSBR[3] | 0 | 30 | 0 |
| Tackifier Resin[4] | 0 | 0 | 6 |
| Carbon Black | 3 | 1 | 0 |
| Silica | 80 | 66 | 30 |
| Oils | 16 | 12 | 0 |
| Waxes | 1.5 | 2 | 1.5 |
| Fatty Acid Soap | 0 | 0 | 2 |
| Silane | 6.4 | 5.2 | 5 |
| Fatty Acid | 0 | 0 | 3 |
| Antidegradants | 3.5 | 0 | 3.5 |
| Stearic Acid | 2 | 4 | 0 |
| Sulfenamide Accelerator | 2.4 | 2.4 | 3 |
| Dithiophosphate Zinc Salt | 0.8 | 0.8 | 0 |
| Zinc oxide | 3 | 3 | 3 |
| Sulfur | 1.5 | 1.5 | 1.2 |
| Diphenylguanidine | 0 | 0 | 1.5 |

[1] Thio-functionalized, tin coupled, solution polymerized copolymer of butadiene and styrene
[2] Emulsion Styrene Butadiene Rubber, 50.8% (by weight) styrene, 8.2% vinyl 1,2; 4.2% cis 1,4; 36.8% trans 1,4; Tg (inflection) = −13° C.; 1% styrene sequences ≥5; from The Goodyear Tire & Rubber Company
[3] Non-functionalized solution polymerized copolymer of butadiene and styrene
[4] unreactive alkylphenol/formaldehyde resin, as SP 1068 from SI Group Table 4 shows Shore A hardness values of the example compositions of Table 3.

TABLE 4

Tread cap compound examples

| Sample number | v | vi | vii |
|---|---|---|---|
| Shore A Hardness [a] | 50 | 55 | 60 |

[a] Shore A hardness measured according to ASTM D2240.

Examples for suitable groove reinforcement rubber compounds may for instance be found in U.S. Pat. No. 10,427,463 B2, see in particular in Examples 1, 2, 3, 4 and 5. The teachings of U.S. Pat. No. 10,427,463 B2 are incorporated herein by reference for the purpose of describing such suitable groove reinforcement rubber formulations that can be utilized in the practice of this invention. Such compounds have a high Shore A hardness which are covered by the ranges of some embodiments of the subject invention as delineated herein. For the sake of illustration, two of the examples of that publication are listed herein below in Tables 5 to 8 Moreover, the whole content of U.S. Pat. No. 10,427,463 B2 is incorporated herein by reference in its entirety.

TABLE 5

Groove reinforcement compounds

| Sample number | 1 | 2 | 3 | 4 |
|---|---|---|---|---|
| polybutadiene | 10 | 10 | 10 | 10 |
| styrene-butadiene copolymer (oil extended) | 97.5 | 97.5 | 97.5 | 97.5 |
| carbon black | 50 | 50 | 50 | 50 |
| silica | 20 | 20 | 20 | 20 |
| silane | 2 | 2 | 2 | 2 |
| phenol-formaldehyde resin[1] | 20 | 20 | 20 | 20 |
| hexamethylene tetramine | 3 | 3 | 3 | 3 |
| styrene-alpha methyl styrene resin[2] | 8 | 12 | 16 | 8 |
| carbamic resin[3] | 0 | 0 | 0 | 4 |
| wax | 1.5 | 1.5 | 1.5 | 1.5 |
| antioxidants | 3 | 3 | 3 | 3 |
| stearic acid | 3 | 3 | 3 | 3 |
| processing aid | 2 | 2 | 2 | 2 |
| zinc oxide | 2.5 | 2.5 | 2.5 | 2.5 |
| sulfur | 1.6 | 1.6 | 1.6 | 1.6 |
| N-tertbutyl-2benzothiazolesulfenamide | 1.63 | 1.63 | 1.63 | 1.63 |
| N-Cyclohexylthiophthalimide | 0.3 | 0.3 | 0.3 | 0.3 |

[1] SMD 30207 from Schenectedy Chemicals
[2] Resin 2336 from Eastman
[3] Alnovol® UF410, from Allnex Table 6 shows high Shore A hardness values above 80 as well as considerable elongation at break values over 300% for the compounds 1 to 4 of Table 5.

TABLE 6

Groove reinforcement compounds

| Sample number | 1 | 2 | 3 | 4 |
|---|---|---|---|---|
| Shore A [a] | 83.3 | 81.8 | 83 | 85.6 |
| Elongation at break (%) [b] | 329 | 359 | 390 | 426 |

[a] Shore A hardness measured according to ASTM D2240.
[b] Ring sample test based on ASTM D412 and DIN 53504.

Table 7 lists further examples of potential compounds that could be used as groove reinforcement rubber compounds.

TABLE 7

Groove reinforcement compounds continued

| Sample number | 5 | 6 | 7 | 8 | 9 |
|---|---|---|---|---|---|
| Polybutadiene | 20 | 20 | 20 | 20 | 20 |
| Natural Rubber | 80 | 80 | 80 | 80 | 80 |
| Carbon Black | 50 | 50 | 50 | 50 | 50 |
| Waxes | 1.5 | 1.5 | 1.5 | 1.5 | 1.5 |
| Antidegradant | 2.5 | 2.5 | 2.5 | 2.5 | 2.5 |
| Ricon 184[5] | 0 | 15 | 0 | 35 | 0 |
| Ricon 100[6] | 0 | 0 | 15 | 0 | 35 |
| Oil | 15 | 0 | 0 | 0 | 0 |
| Stearic Acid | 3 | 3 | 3 | 3 | 3 |
| Silica | 20 | 20 | 20 | 20 | 20 |
| silane disulfide | 2 | 2 | 2 | 2 | 2 |
| phenol formaldehyde resin | 20 | 20 | 20 | 20 | 20 |
| fatty acid soap | 2 | 2 | 2 | 2 | 2 |
| hexamethylenetetramine | 3 | 3 | 3 | 3 | 3 |
| Antidegradant | 0.5 | 0.5 | 0.5 | 0.5 | 0.5 |
| Sulfenamide Accelerator | 2.36 | 2.36 | 2.36 | 2.36 | 2.36 |
| zinc oxide | 2.5 | 2.5 | 2.5 | 2.5 | 2.5 |
| sulfur | 1.6 | 1.6 | 1.6 | 1.6 | 1.6 |
| vulcanization inhibitor | 0.3 | 0.3 | 0.3 | 0.3 | 0.3 |

[5] liquid styrene-butadiene, Mn = 8600
[6] liquid styrene-butadiene, Mn = 4000

Table 8 shows again high Shore A hardness values as well as considerable elongation at break values for the materials 5-9 of Table 7.

TABLE 8

| Groove reinforcement compounds continued | | | | | |
|---|---|---|---|---|---|
| Sample number | 5 | 6 | 7 | 8 | 9 |
| Shore A Hardness | 86 | 85.4 | 86.6 | 89.3 | 90.6 |
| Elongation at Break (%) | 508 | 518 | 508 | 481 | 502 |

As visible in these examples for the groove reinforcement compounds, Shore A hardness values may, if desired, be higher than in the base layer compound or the tread cap compound. Moreover, elongation at break is higher than 300% in all samples. However, this shall not be indispensable for the scope of the present invention.

In general, the tread cap layer, the groove reinforcement and the tread base layer may be extruded together to form the tread as known to the person skilled in the art of extrusion and/or tire building. Thus, as non-limiting examples, gear pumps and/or triplex or quadruplex extruders could be used.

Variations in the present invention are possible in light of the provided description. While certain representative embodiments, examples and details have been shown for the purpose of illustrating the subject invention, it will be apparent to those skilled in this art that various changes and modifications can be made therein without departing from the scope of the invention. It is, therefore, to be understood that changes may be made in the particular example embodiments described which will be within scope of the invention as defined by the following appended claims. In any case the above described embodiments and examples shall not be understood in a limiting sense. In particular, the features of the above embodiments may also be replaced or combined with one another.

The invention claimed is:

1. A tire tread having circumferential grooves, each circumferential groove having a bottom, and an outer radial surface, the tread further comprising: a tread cap comprising a first rubber compound which is adapted to be ground contacting when driving, at least one circumferential groove reinforcement forming at least one reinforced groove in the tread cap, the groove reinforcement comprising a second rubber compound for reinforcing an area adjacent the grooves formed by the groove reinforcement, wherein the groove reinforcement comprises for at least one reinforced groove formed by the groove reinforcement:

two groove sidewall layers, each of the two groove sidewall layers extending from the outer radial surface of the tread down into the direction of the bottom of the groove formed by the groove reinforcement and wherein each of the two groove sidewall layers of the groove reinforcement has an essentially uniform thickness along its length, and a groove support portion forming a bottom portion of the groove and having a radially inner base side as well as a radially outer top side, wherein the groove support portion tapers from its base side to its top side, wherein the groove support portion has an essentially trapezoidal shape tapering from the base side to the top side wherein the base side and the top side are interconnected at their lateral edges by lateral sides, wherein the lateral sides are at an angle α to the base side which is smaller than 90°, wherein the support portion has a radial height which is at least 15% of the distance between the bottom of the groove and the inner radial side of the tread base layer as measured radially below the reinforced groove, and wherein the angle θ between the lateral side of the support portion and each of the two groove sidewall layers of the groove reinforcement is smaller than 180°.

2. The tire tread of claim 1, wherein the tread further comprises a tread base layer arranged radially inwards of the tread cap, the tread base layer comprising a third rubber compound, wherein the groove reinforcement extends in a radially inner direction at least onto the radially outer surface of the base layer.

3. The tire tread of claim 1, wherein the groove support portion extends in a radially outer direction at most up to 1 mm above the upper radial surface of a tread wear indicator of the groove reinforced by the groove reinforcement, and wherein the sidewall layers having essentially uniform thickness extend to the radial outer side of the tapering groove support portion.

4. The tire tread of claim 1, wherein the groove support portion and the sidewall layers are integrally formed.

5. The tire tread of claim 1, wherein the base side is longer than the top side, and wherein the groove support portion further has two lateral sides connecting the base side and the top side, and wherein the angle between at least one of the lateral sides and the base side is at most 85°.

6. The tire tread of claim 1, wherein the tread further has a tread base layer arranged radially inwards of the tread cap and the groove reinforcement, wherein the radial height of the groove support portion is at least 50% larger than the radial distance between the bottom of the groove and a radial upper side of the tread base layer.

7. The tire tread of claim 1, wherein the base side of the support portion is from 1.1 to 5 times longer than the axial width of the bottom of the reinforced groove.

8. The tire tread of claim 1, wherein the sidewall layer has an essentially uniform thickness which is within the range of 0.5 mm to 4 mm.

9. The tire tread of claim 1, wherein the groove sidewall layers extend from the top of the unworn tread at least over 70% of the depth of the groove when viewed in parallel to the sidewall of the groove.

10. The tire tread of claim 1, wherein a ratio between thickness of the sidewall layer and length of the sidewall layer having essentially uniform thickness is at most 1:10.

11. The tread of claim 1, wherein all grooves of the tire tread are reinforced with said groove reinforcement.

12. The tread of claim 1, wherein both sidewall layers have essentially the same thickness.

13. The tread according to claim 1, wherein at least one of the sidewall layers and a line connecting an axial edge of the top side and an axial edge of the base side at said sidewall layer intersect with an angle of between 175° and 90°.

14. The tread of claim 1, wherein the groove reinforcement compound has a Shore A hardness of at least 75 and an elongation at break of at least 300%, and wherein the tread cap compound has a Shore A hardness of between 40 and 75, and wherein the Shore A hardness of the groove reinforcement compound is higher than the Shore A hardness of the tread cap compound.

15. The tread according to claim 1, wherein the support portion has a radial height which is at least 20% of the distance between the bottom of the groove and the inner radial side of the tread base layer as measured radially below the reinforced groove.

16. The tread according to claim 1, wherein the tread cap is comprised of a rubber which is softer than rubber of the groove reinforcement and wherein the rubber in the tread base is softer than the rubber in the tread cap.

17. The tread according to claim 16 wherein the tread cap is comprised of a thio-functionalized tin coupled solution styrene-butadiene rubber and natural rubber, wherein the groove reinforcement is comprised of polybutadiene rubber and styrene-butadiene rubber, and wherein the tread base is comprised of polybutadiene rubber, natural rubber, and a pre-silanized silica.

18. A tire having a tread comprising:
- a tread cap comprising a first rubber compound which is adapted to be ground contacting when driving, at least one circumferential groove reinforcement forming at least one groove in the tread cap having a bottom and an outer radial surface, the groove reinforcement comprising a second rubber compound for reinforcing an area adjacent the grooves formed by the groove reinforcement, wherein the groove reinforcement comprises for at least one of the grooves formed by the groove reinforcement:
- two groove sidewall layers, each of the two groove sidewall layers extending from the outer radial surface of the tread down into the direction of the bottom of the groove formed by the groove reinforcement and wherein each of the two groove sidewall layers has an essentially uniform thickness along its length, and
- a groove support portion forming a bottom portion of the groove and having a radially inner base side as well as a radially outer top side, wherein the groove support portion tapers from its base side to its top side, wherein the groove support portion has an essentially trapezoidal shape tapering from the base side to the top side wherein the base side and the top side are interconnected at their lateral edges by lateral sides, wherein the lateral sides are at an angle $\alpha$ to the base side which is smaller than 90°, wherein the support portion has a radial height which is at least 15% of the distance between the bottom of the groove and the inner radial side of the tread base layer as measured radially below the reinforced groove, and wherein the angle $\theta$ between the lateral side of the support portion and each of the two groove sidewall layers of the groove reinforcement is smaller than 180°.

19. The tire of claim 18, wherein the tire is a pneumatic tire.

* * * * *